United States Patent
Poirier et al.

(10) Patent No.: US 8,589,363 B2
(45) Date of Patent: Nov. 19, 2013

(54) SYSTEMS AND METHODS FOR MANAGING DELTA VERSION CHAINS

(75) Inventors: Jamey C. Poirier, Grafton, MA (US); William Joseph Sylva, Chelmsford, MA (US)

(73) Assignee: Exagrid Systems, Inc., Westborough, MA (US)

( * ) Notice: Subject to any disclaimer, the term of this patent is extended or adjusted under 35 U.S.C. 154(b) by 0 days.

(21) Appl. No.: 13/434,306

(22) Filed: Mar. 29, 2012

(65) Prior Publication Data

US 2013/0024435 A1    Jan. 24, 2013

Related U.S. Application Data

(60) Provisional application No. 61/509,517, filed on Jul. 19, 2011, provisional application No. 61/512,746, filed on Jul. 28, 2011.

(51) Int. Cl.
*G06F 17/00* (2006.01)

(52) U.S. Cl.
USPC ........... 707/695; 715/229; 715/242; 382/232; 382/244

(58) Field of Classification Search
USPC ........ 707/695, 638, E17.005, 999.203, 999.1; 715/229, 242, FOR. 221; 382/232, 233, 382/235, 243, 244
See application file for complete search history.

(56) References Cited

U.S. PATENT DOCUMENTS

| | | | |
|---|---|---|---|
| 5,574,906 A * | 11/1996 | Morris | 707/640 |
| 5,729,743 A | 3/1998 | Squibb | |
| 5,745,906 A | 4/1998 | Squibb | |
| 5,758,154 A * | 5/1998 | Qureshi | 713/1 |
| 5,850,565 A | 12/1998 | Wightman | |
| 5,893,119 A | 4/1999 | Squibb | |
| 6,018,747 A | 1/2000 | Burns et al. | |
| 6,374,250 B2 | 4/2002 | Ajtai et al. | |
| 6,401,239 B1 * | 6/2002 | Miron | 707/695 |
| 6,460,052 B1 * | 10/2002 | Thomas et al. | 707/695 |

(Continued)

FOREIGN PATENT DOCUMENTS

| | | |
|---|---|---|
| EP | 0 981 099 A2 | 2/2000 |
| EP | 2 549 394 A1 | 1/2013 |

OTHER PUBLICATIONS

Joshua P. MacDonald—"File System for Delta Compression"—2000, mail.xmailserver.net (pp. 1-32).*

(Continued)

*Primary Examiner* — Jean B Fleurantin
*Assistant Examiner* — Anh Ly
(74) *Attorney, Agent, or Firm* — Mintz Levin Cohn Ferris Glovsky and Popeo, P.C.

(57) ABSTRACT

A system, a method, and a computer program product for managing delta version chains are provided. A version chain having a plurality of versions of data is provided. A first delta-compressed version and a second delta-compressed version corresponding to a first version of data in the version chain and a second version of data in the version chain, respectively, are selected. A third delta-compressed version configured to be independent of at least one of the first delta-compressed version and the second delta-compressed version and further configured to contain at least one third instruction determined based on at least one of the following: the first insert instruction, the second insert instruction, the first copy instruction, and the second copy instruction, is generated.

30 Claims, 13 Drawing Sheets

(56) References Cited

U.S. PATENT DOCUMENTS

| | | | |
|---|---|---|---|
| 6,925,467 B2* | 8/2005 | Gu et al. | 707/687 |
| 7,085,768 B2* | 8/2006 | Scott et al. | 707/999.101 |
| 7,246,140 B2* | 7/2007 | Therrien et al. | 707/999.202 |
| 7,246,275 B2* | 7/2007 | Therrien et al. | 714/710 |
| 7,454,431 B2 | 11/2008 | Vo et al. | |
| 7,593,966 B2* | 9/2009 | Therrien et al. | 707/999.202 |
| 7,596,632 B1 | 9/2009 | Vo | |
| 7,600,225 B2 | 10/2009 | Sliger et al. | |
| 7,747,589 B2* | 6/2010 | Lomet | 707/999.203 |
| 7,912,819 B2* | 3/2011 | He et al. | 707/695 |
| 7,925,623 B2 | 4/2011 | Therrien et al. | |
| 7,984,420 B2* | 7/2011 | Eldridge et al. | 707/695 |
| 8,122,067 B2* | 2/2012 | Scott et al. | 707/806 |
| 2002/0010702 A1* | 1/2002 | Ajtai et al. | 707/101 |
| 2003/0212712 A1* | 11/2003 | Gu et al. | 707/200 |
| 2004/0093555 A1* | 5/2004 | Therrien et al. | 714/805 |
| 2005/0132382 A1 | 6/2005 | McGuire et al. | |
| 2006/0112152 A1 | 5/2006 | Napier et al. | |
| 2007/0067359 A1 | 3/2007 | Barrs et al. | |
| 2007/0130232 A1* | 6/2007 | Therrien et al. | 707/204 |
| 2008/0228795 A1* | 9/2008 | Lomet | 707/E17.005 |
| 2010/0306412 A1* | 12/2010 | Therrien et al. | 709/247 |

OTHER PUBLICATIONS

Randal C. Burns and Darrell D. E. Long—"Efficient distributed backup with delta compression"—Proceeding IOPADS '97 Proceedings of the fifth workshop on I/O in parallel and distributed systems—pp. 26-36.*

Research and Advanced Technology for Digital Libraries—Lecture Notes in Computer Science vol. 1923, 2000, pp. 128-143 "Implementing a Reliable Digital Object Archive"—Brian Cooper, Arturo Crespo, Hector Garcia-Molina.*

European Search Report for EP 12 173 480 mailed Oct. 2, 2012.

Burns and Long, "Efficient Distributed Backup with Delta Compression", Mar. 29, 2012.

Burns and Narang, "Version Management and Recoverility for Large Object Data", Mar. 29, 2012.

Joshua P. MacDonald, "File System Support for Delta Compression", Mar. 29, 2012.

Suel and Memon, "Algorithms for Delta Compression and Remote File Synchronization", Mar. 29, 2012.

* cited by examiner

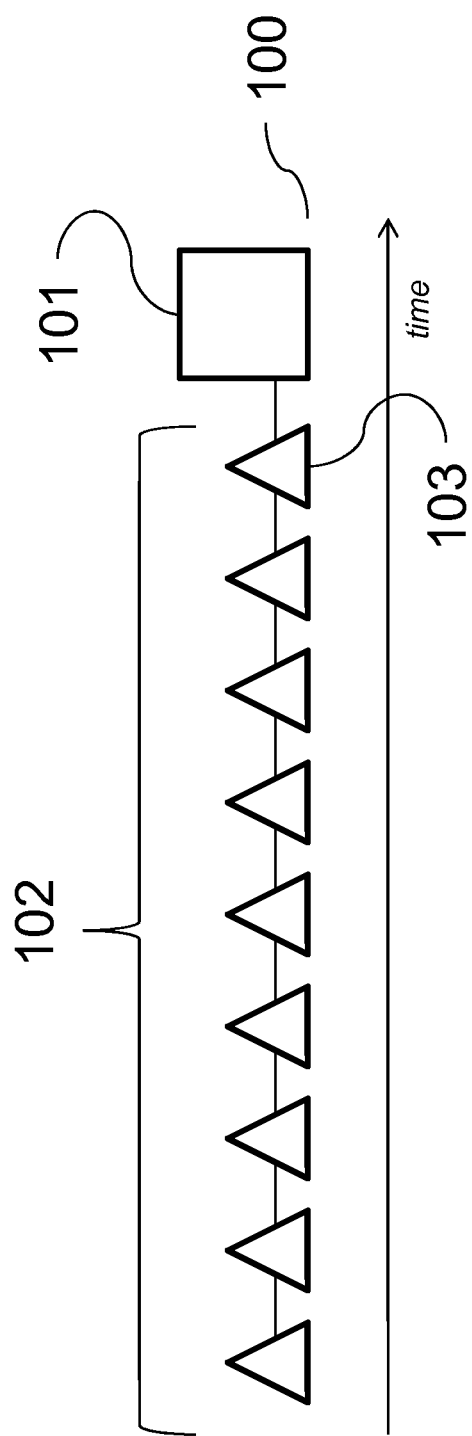

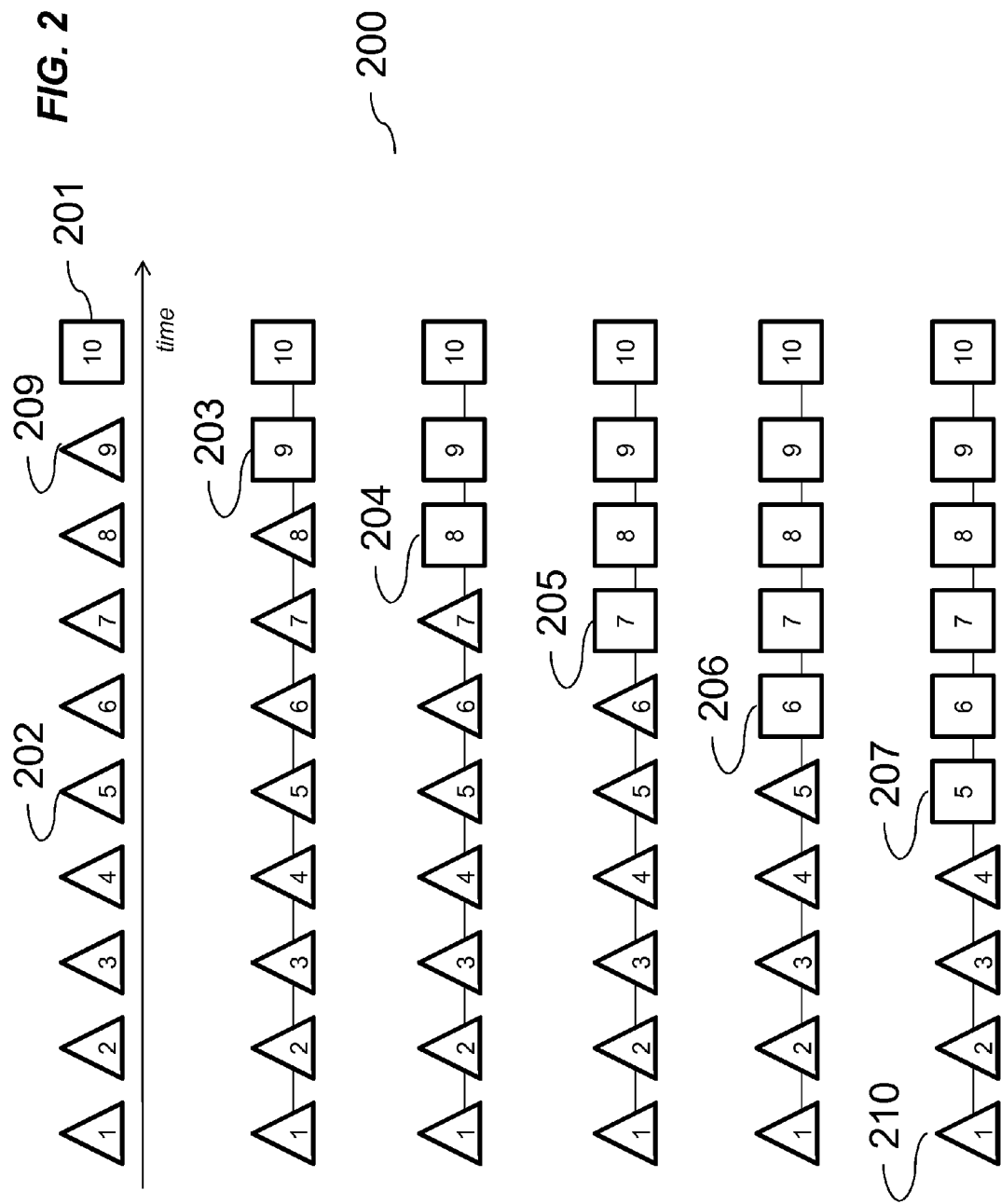

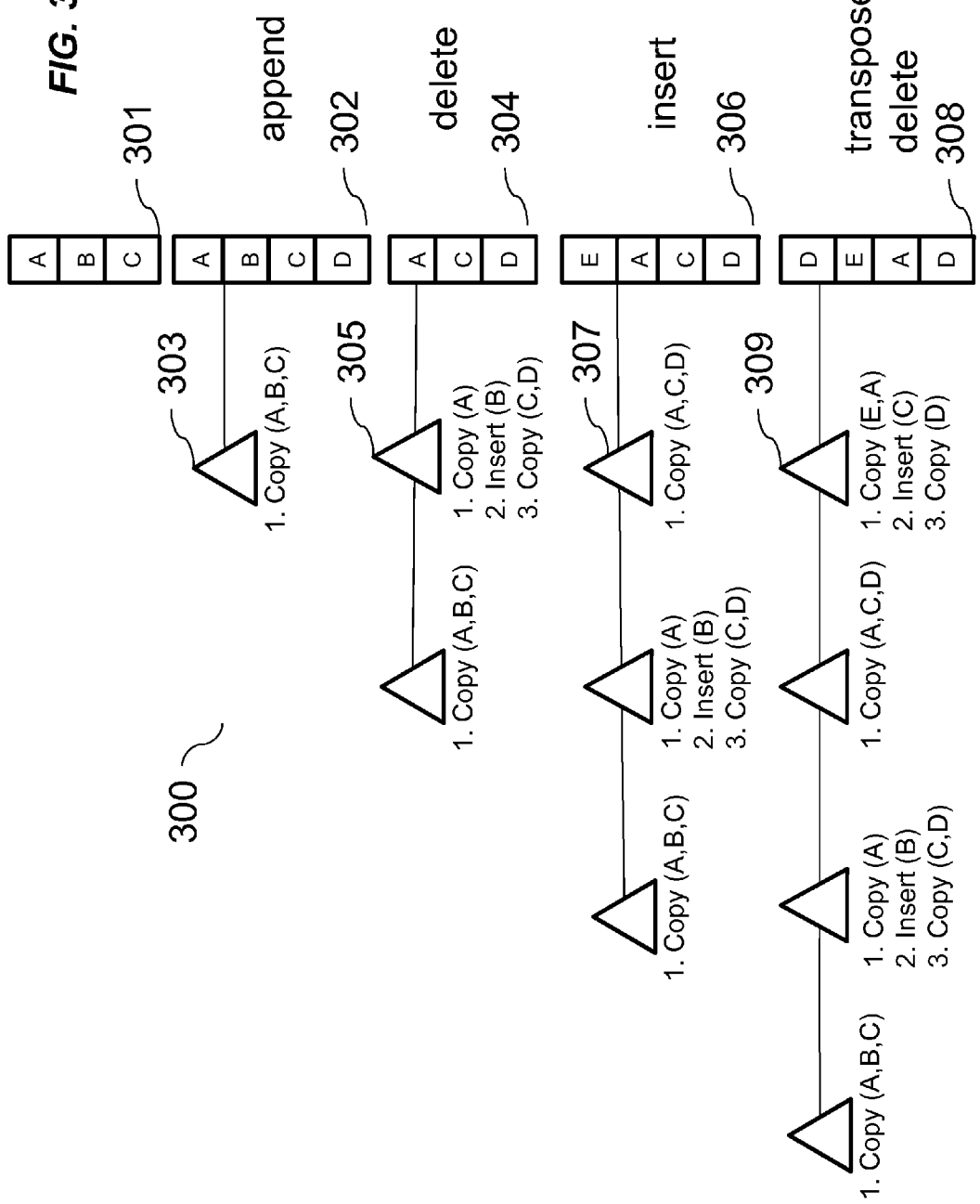

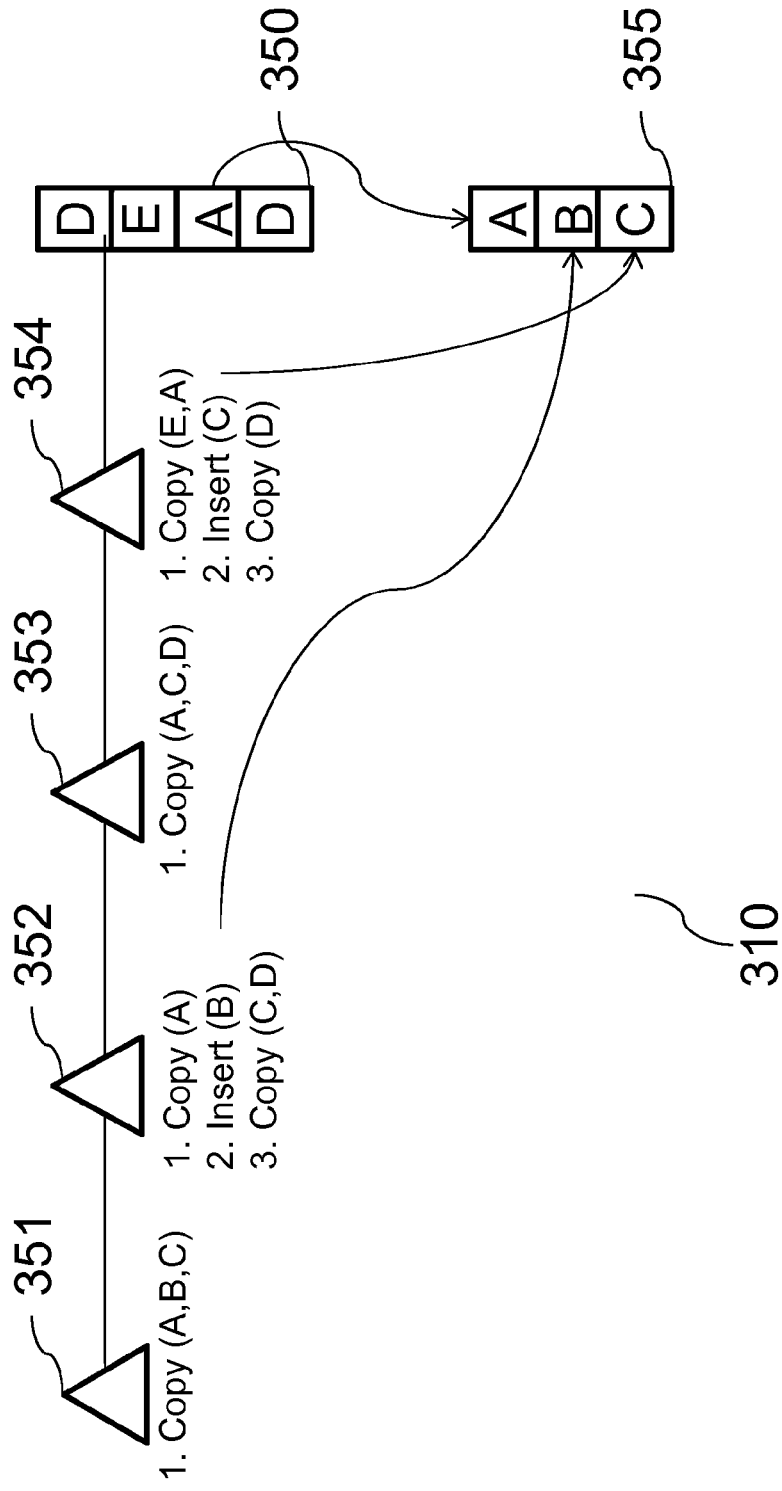

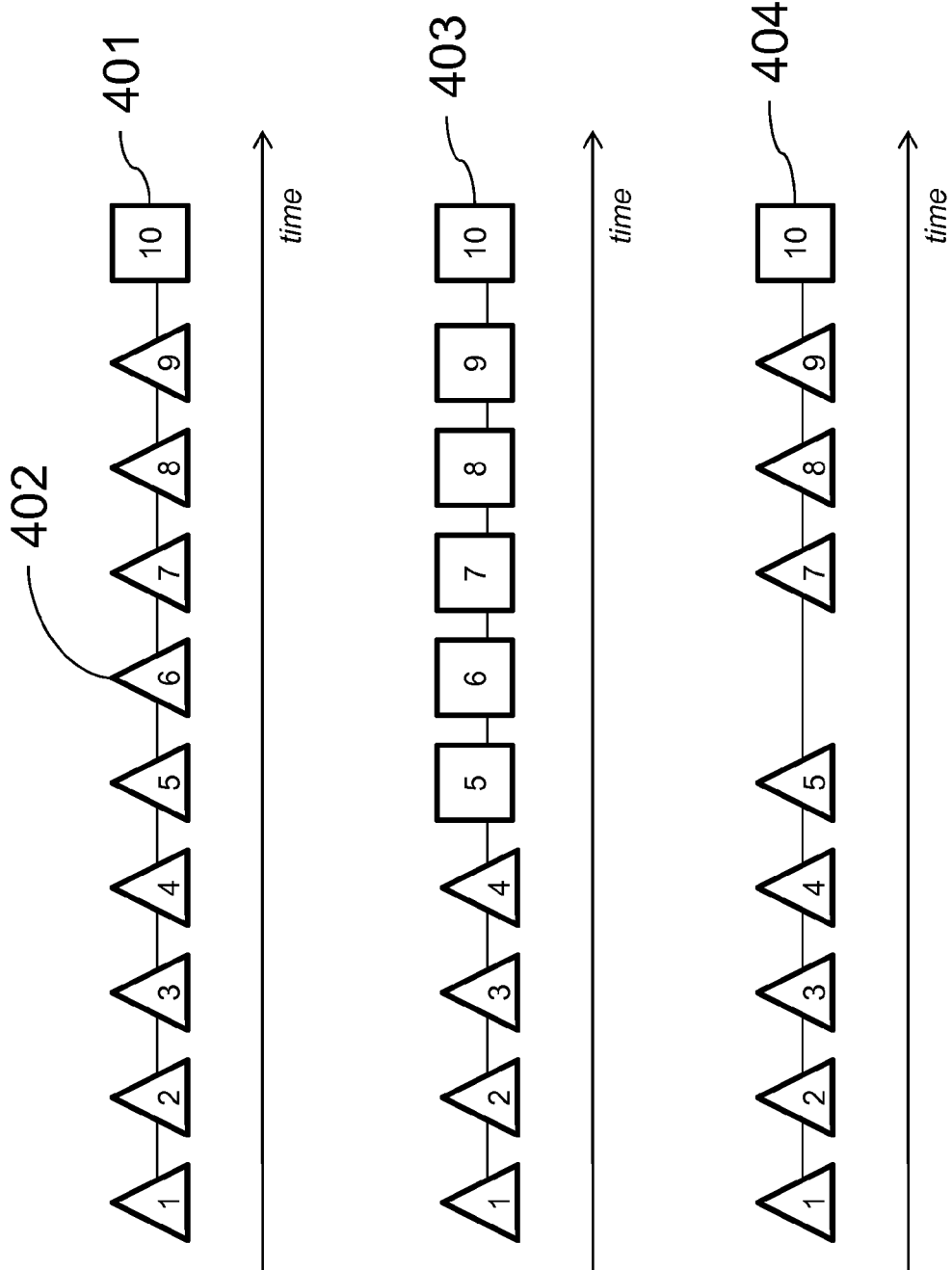

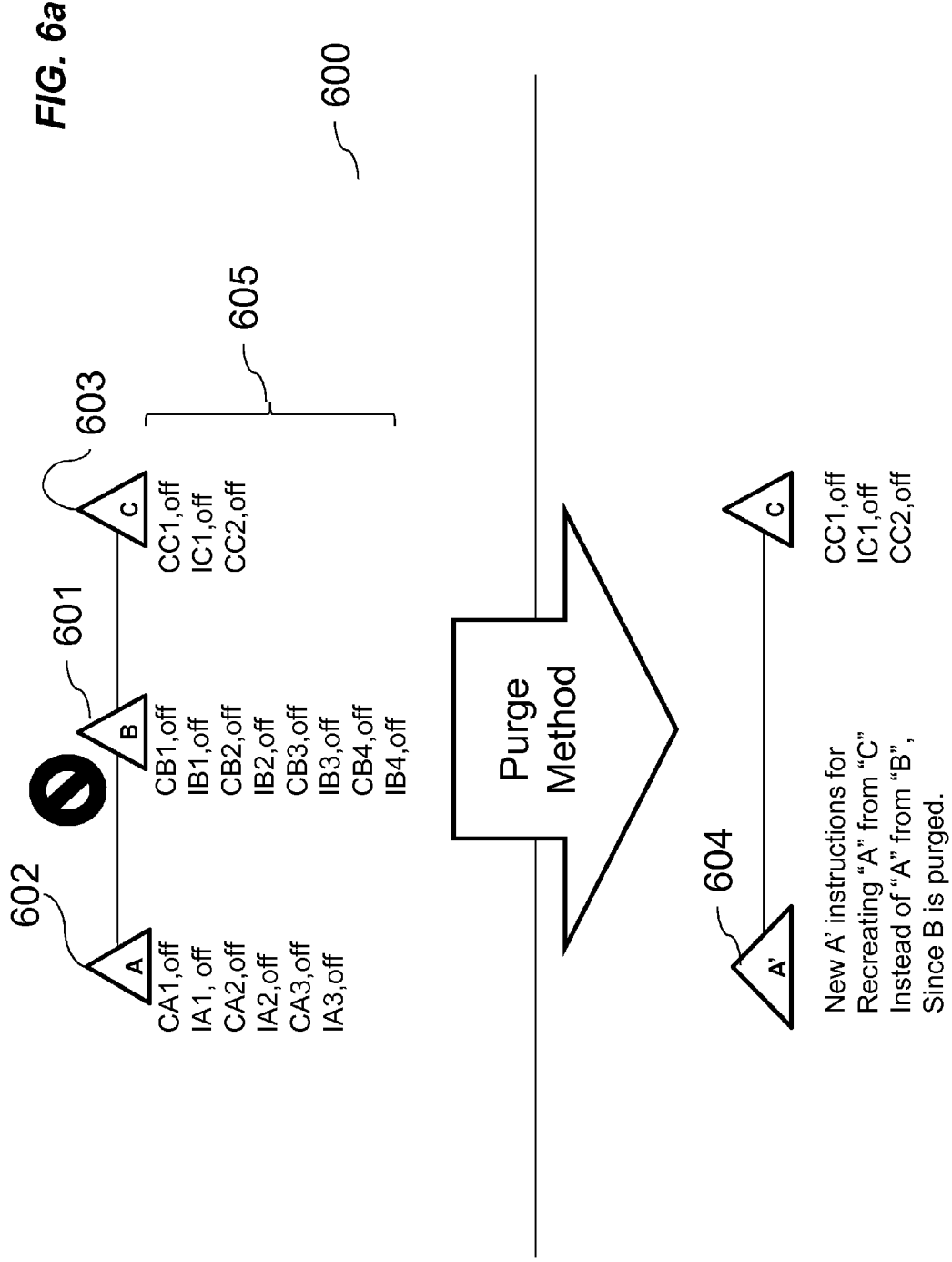

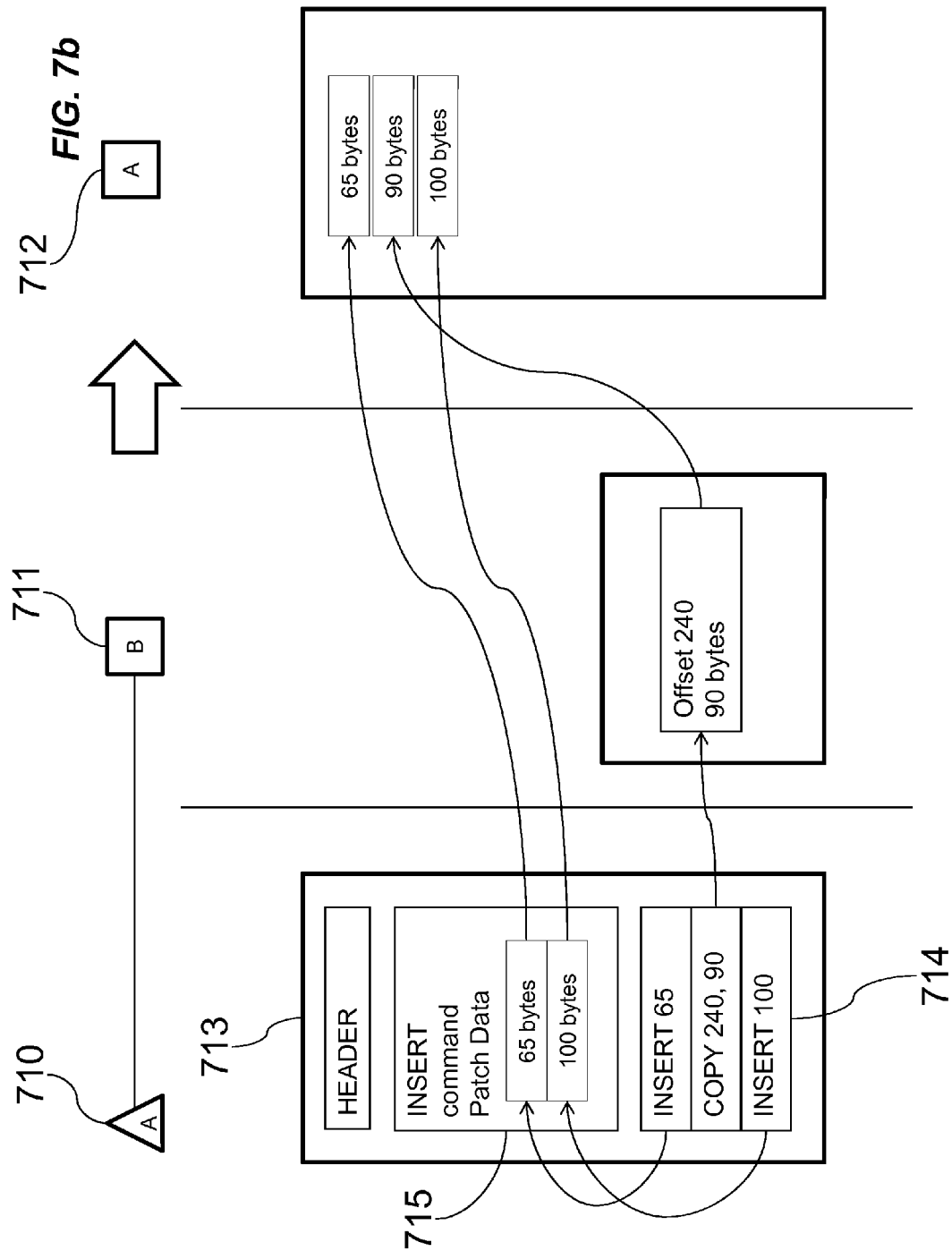

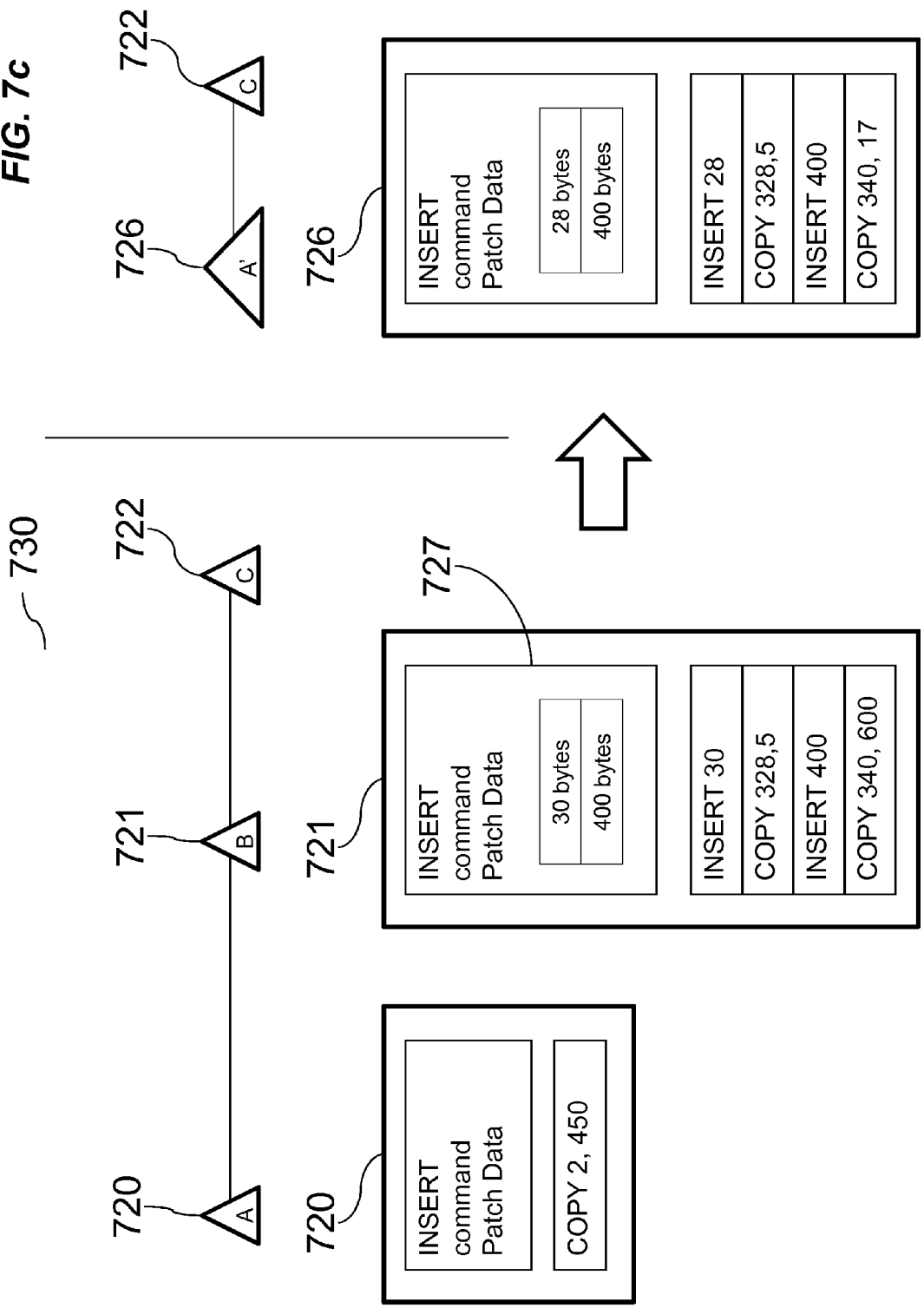

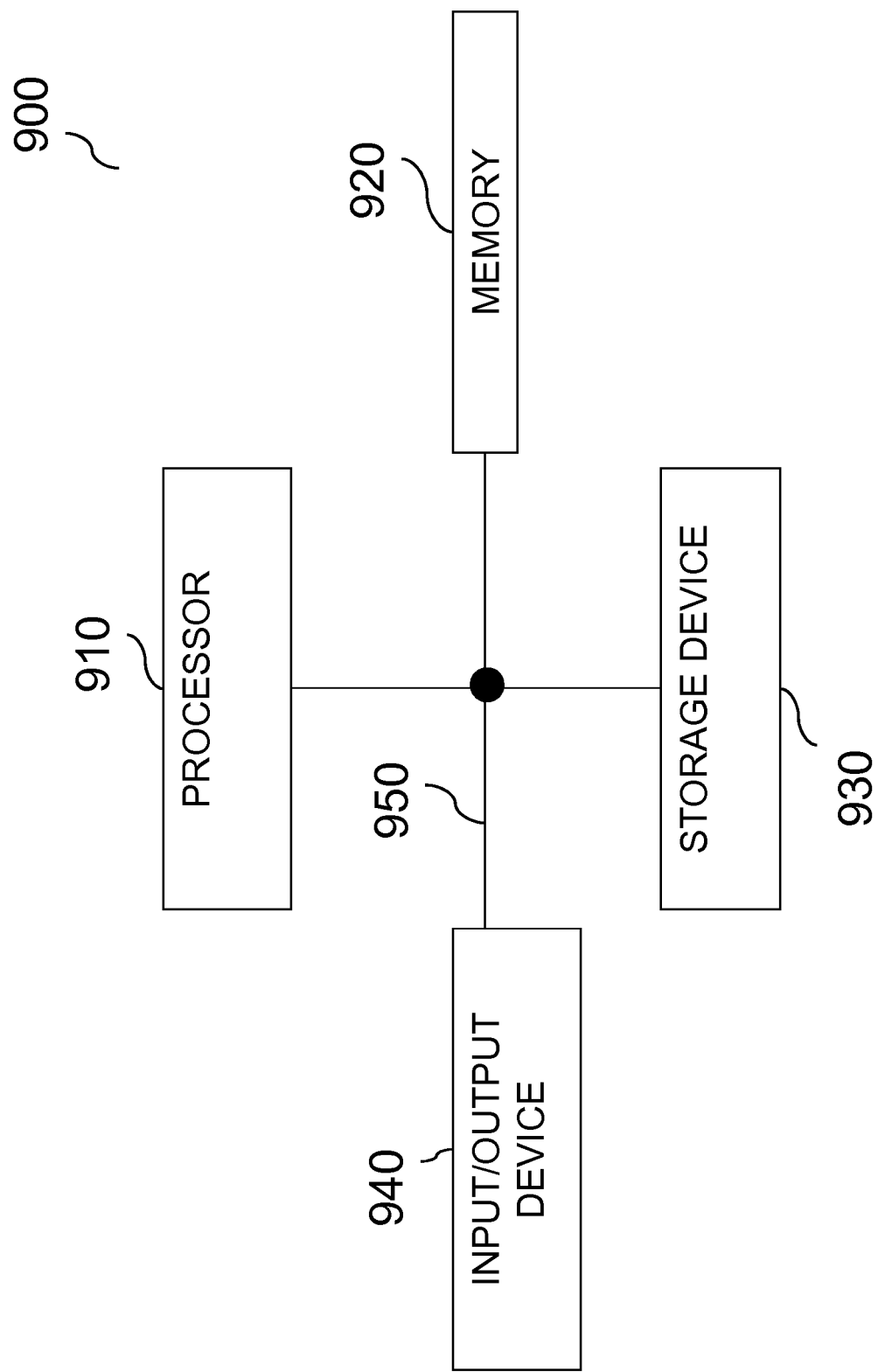

SYSTEMS AND METHODS FOR MANAGING DELTA VERSION CHAINS

CROSS-REFERENCE TO RELATED APPLICATIONS

The present application claims priority to U.S. Provisional Patent Application Ser. No. 61/509,517 to Sylva, et al., filed Jul. 19, 2011, and entitled "Efficient Restore and Purging in Delta Version Chains" and U.S. Patent Provisional Application No. 61/512,746 to Sylva et al., filed Jul. 28, 2011, entitled "Efficient Restore and Purging in Delta Version Chains" and incorporates disclosures of these applications herein by reference in their entireties.

TECHNICAL FIELD

The subject matter described herein relates to data processing and in particular, to systems and methods for efficiently managing version chain collections of delta compressed files.

BACKGROUND

Version chains are linear/serial data structures that can hold the contents of versions of the same or similar data over time. For example, a file that is originally created and then modified four times can be represented as a linear reverse delta version chain, where the most recent version can be stored in its whole form and all earlier versions can be stored as difference/delta files from each other, connected in a linear fashion into a version chain. While linear arrangement of delta versions can be one of the simplest data structures for version chains, there are processing operations on the delta files that make up version chains that can make the linear arrangement inefficient and cumbersome. For example, when an end-user requests a restoration of an early version of a file from version chains that contain backup data, the existing conventional methods of restoring one or more files can be slow, serial processes whose processing time can be directly proportional to the "distance" the version to be restored is located at with respect to the base file of the version chain (i.e., least or most recent). The farther the version is located, the more time it will take to restore that version, as it involves un-delta-compressing each pair of files from the most recent version backwards. For chains that have thousands of delta version files, restoring times can easily extend into many minutes/hours. Such restoration can strain both computing as well as disk input/output ("I/O") resources. It can also lead to frustration on the part of a user that requested file restoration, as the user may need a file to be restored very quickly in order to make a timely decision or meet an important deadline.

Use of conventional linear arrangement of version chains also presents a problem for data backup operations. Similar to the end-user requested backup file recovery process, when a collection of version chains representing delta compressed historical versions of successive data nightly and weekend backups of primary storage systems, a conventional procedure uses delta compressed version chains as a source for making magnetic tape backups that can be sent offsite in order to recover from a local site disaster. Backup administrators that employ a local delta compressed backup system may need to make one or more magnetic tapes from versions that are not the most recent version in the version chain. This can increase an amount of data storage that is needed to backup all that data.

Additionally, removal of one or more delta version files from a linear version chain can present an issue, as it can require delta-decompression of all of the more recent versions in order to remove the desired version as well as reconnection of two delta version neighbors that are adjacent to the removed version. Day to day management of delta version files within version chains can involve many (e.g., tens, hundreds, thousands, millions, etc.) purge operations, which can cause significant processing delays, consume large amounts of computing and/or I/O disk resources, prevent user access to data for a long time, as well as many other issues.

SUMMARY

In some implementations, the current subject matter relates to a method for managing delta version chains. A version chain having a plurality of versions of data can be provided. A first delta-compressed version and a second delta-compressed version corresponding to a first version of data in the version chain and a second version of data in the version chain, respectively, can be selected. The second delta-compressed version can be configured to depend on the first delta compressed version. The first delta-compressed version can be configured to include at least one of a first copy instruction and a first insert instruction. The second delta-compressed version can be configured to include at least one of a second copy instruction and a second insert instruction. A third delta-compressed version configured to be independent of at least one of the first delta-compressed version and the second delta-compressed version and further configured to contain at least one third instruction determined based on at least one of the following: the first insert instruction, the second insert instruction, the first copy instruction, and the second copy instruction can be generated. At least one of the providing, the selecting, and the generating can be performed on at least one processor.

In some implementations, the current subject matter can be configured to include at least one of the following optional features. The third delta-compressed version can contain at least one of the first insert instruction and the second insert instruction. The third delta-compressed version can contain an instruction that is modified from at least one of the first insert instruction and the second insert instruction. The third delta-compressed version can contain at least one of the first and second copy instructions depending on whether the first and second instructions are different from one another. The third delta-compressed version can contain an instruction that is modified from at least one of the first copy instruction and the second copy instruction.

The method can also include executing at least one third instruction contained in the generated third delta-compressed version to generate an uncompressed version of data in the version chain.

At least one third instruction can include at least one parameter, wherein the at least one parameter includes at least one of the following a length parameter defining a length of data to be copied in the uncompressed version of data and an offset parameter defining a location of data to be copied in the uncompressed version of data.

The executing can include executing the at least one third instruction contained in the generated third delta-compressed version in a predetermined order.

At least one of the first and second copy instructions can cause a copy of a data segment into an uncompressed version of data in the version chain, wherein the data segment is present in both a first uncompressed version of data configured to be generated based on the first delta-compressed version and in a second uncompressed version of data configured to be generated based on the second delta-compressed version. The first insert operation can cause insertion of a first data segment into the uncompressed version of data in the version chain, wherein the first data segment is present in a first uncompressed version of data configured to be generated based on the first delta-compressed version. The second insert instruction can cause insertion of a second data segment into the uncompressed version of data in the version chain, wherein the second data segment is present in a second uncompressed version of data configured to be generated based on the second delta-compressed version.

The method can also include deleting at least one of the first delta-compressed version and the second delta-compressed version without uncompressing the first delta-compressed version and the second delta-compressed version. Further, the method can include repeating the providing, the selecting, and the generating operations to enable faster restore of a version in the version chain.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 illustrates a linear version chain;

FIG. 2 illustrates a procedure for restoring an earlier version in a delta chain;

FIG. 3a illustrates a process for creating a version chain;

FIG. 3b illustrates an exemplary process for restoring an earlier version of a file, according to some implementations of the current subject matter;

FIG. 4 illustrates a version delete operation on a linear version chain;

FIGS. 6a and 6b illustrate more detailed views of the purging of a single version from a version chain based on misaligned delta version file segment offsets shown in FIG. 5;

FIG. 7b is a detailed view of a delta decompression operation;

FIG. 7c illustrates an exemplary process for managing byte offsets when a version is purged from the delta version chain, according to some implementations of the current subject matter;

FIG. 9 illustrates an exemplary system, according to some implementations of the current subject matter.

DETAILED DESCRIPTION

Figure 5:
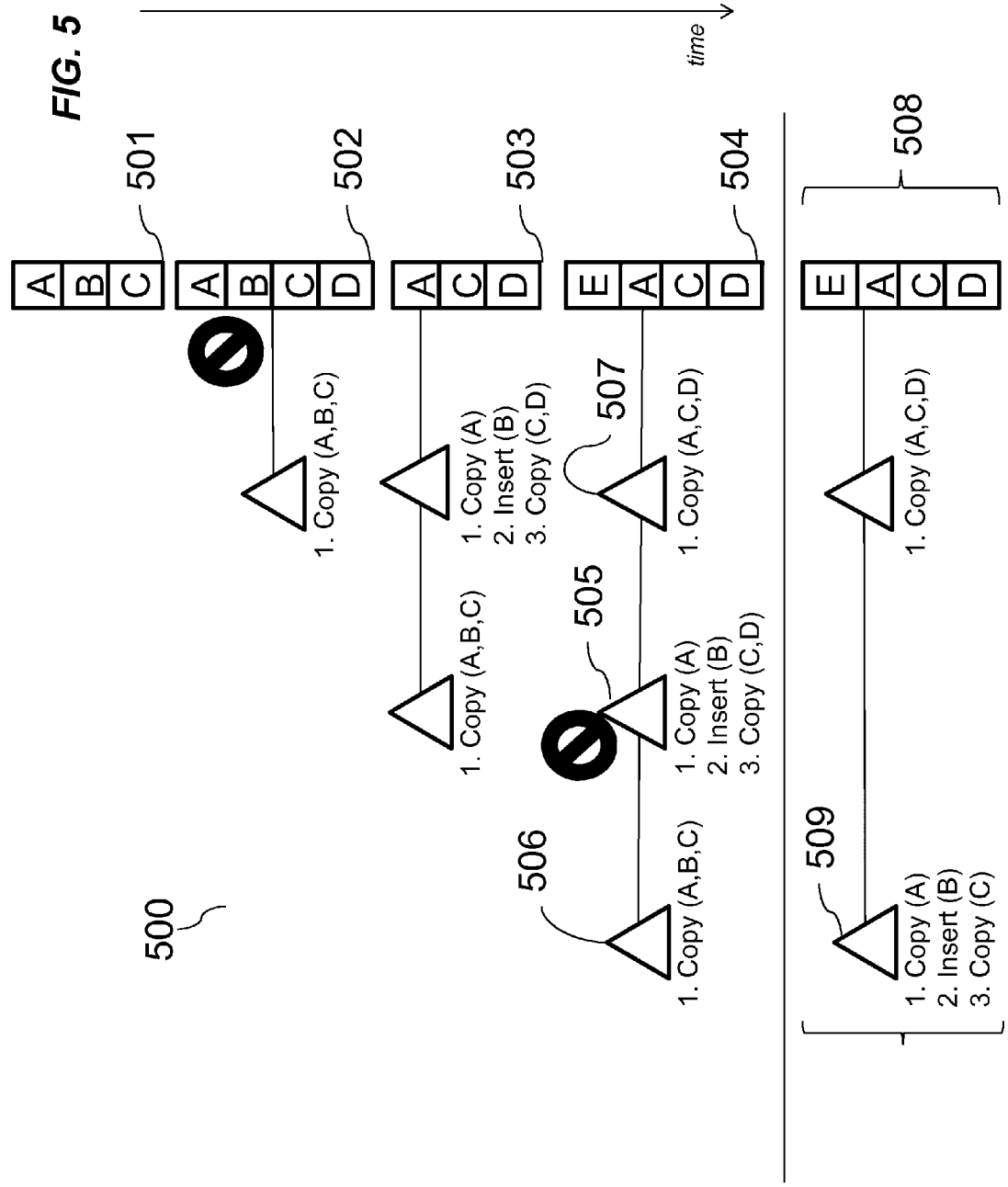
FIG. 5 illustrates an exemplary process for purging a version within the version chain, according to some implementations of the current subject matter.

To address these and potentially other deficiencies of currently available solutions, one or more implementations of the current subject matter provide methods, systems, articles or manufacture, and the like that can, among other possible advantages, provide systems and methods for providing systems, methods, and computer program products for efficiently managing version chain collections of delta compressed files.

In some implementations, the current subject matter's systems and methods can reduce end-user data backup file restoration times by orders of magnitude over conventional methods. Similar to end-user backup file restore requests, creation of backup magnetic tapes that use disk based delta compressed version chains as the source of data can be accelerated. Additionally, some implementations of the current subject matter can simplify and/or accelerate by orders of magnitude a process of purging one or more versions from within a version chain. For example, when yearly and monthly backup versions are aggregated into the same collection of version chains, the delta files that represent monthly backups may have to be purged sooner than the yearly delta files. Some implementations of the current subject can expedite purging of monthly backup delta versions.

The following is a discussion of various terms that may be used throughout this disclosure and is provided here for illustrative, non-limiting purposes. A version can be a single binary data file, such as a time-stamped data file. A version chain can be plurality of versions which can contain similar data with and/or without differences between versions and can be representative of successive data changes over time. A delta compression can be a form of compression where one version in a version chain can be reduced to containing data which can be dissimilar from another version in the version chain. For common data between the two versions, the delta compressed version can reference a source version. The delta-compressed version can have a dependency on the source version because some data from the source version can be used to uncompress the delta-compressed version. The source version can have a version that can be dependent on it. A delta file or a patch file can be a version in the version chain which can be compressed using delta compression. A self-compressed version or a stand-alone version can be a version in the version chain which can be compressed using a form of compression that can have no dependencies on other versions in the version chain, for example, a ZIP compression.

An exemplary version chain can look like A→B→C, where the symbol "→" can denote directional delta dependency between versions, i.e., A can depends on B. Version A can be in a delta-compressed form (i.e., a patch file) which can depend on version B. Version B can be in a delta-compressed form (i.e., a patch file) which can depend on version C. Version C can be a self compressed version.

Today's computing systems implement various applications that leverage version chains and delta compression.

Such systems include software source control that can efficiently manage multiple versions of source files over time so that a user can request and/or acquire any earlier version of a file. These systems also include backup systems that can store day to day backups in version chains using delta compression to eliminate redundancy among successive backups. Computer file systems also maintain a history of files over time using version chains.

In these systems and/or applications, within a stream of data that is to be versioned, there can exist data segments that can be similar and/or identical in content. By identifying similar/identical segments and grouping each of them together into version chains, and applying delta compression between successive pairs of historical versions, an overall consumed capacity of these similar segments can be reduced by factors of 10:1 to 1,000,000:1 and/or greater.

Computing systems and/or applications can leverage a delta compression algorithm to determine which sequence of bytes are similar and/or identical between two files and which sequence of bytes are different between the same two files. Bytes ranges that are common between two files can be stored in a delta file as a COPY command or instruction, which defines starting and ending offsets of data to be copied. Bytes ranges that are different between two files can be stored as an INSERT command or instruction, which includes offset and length of a different byte range as well as actual bytes that are different. Thus, a delta compressed file can include a predetermined collection or a "recipe" of INSERT and/or COPY commands or instructions that can provide guidance and/or instructions as to how to generate and/or create a full file version from a delta compressed file and its adjacent full version. For ease of description, the following description will use the word "command" when referring to INSERT and/or COPY commands/instructions.

Un-compression can involve use of a patch file. A patch file can include instructions and data. The instructions can describe how to uncompress the patch file to produce the original uncompressed version data. The data in the patch file can be data which can be dissimilar from the version that the patch file depends on. The patch file can have two instruction types, COPY(offset, length) and INSERT(length). During un-compression, these instructions can be executed serially from first to last. A COPY instruction can instruct to proceed the <offset> in the version that the patch depends on, and copy <length> number of bytes to the uncompressed output file. An INSERT instruction can instruct to take <length> bytes of data contained in the patch file and write them to the target uncompressed output file. By executing all patch file instructions in order, an uncompressed output file can be generated which can contain the original uncompressed data from the version (A) which was delta compressed against version (B). Un-compression of the patch file (A) can require uncompressed data from version (B) to satisfy the COPY instructions.

In today's systems, a potentially long length of a version chain can be problematic for operations such as restoring/recalling an earlier version of a delta file from within a version chain (e.g., a version that is located at end of the chain as opposed to closer to the beginning of the chain, i.e., substantially adjacent to most recent full version of a file) as well as deleting one or more versions from somewhere the middle of a version chain. Conventional ways of restoring an earlier version of a file in a reverse delta chain start with the most recent version of the file in the version chain and its adjacent delta in order to produce the uncompressed version of the earlier file. This process is repeated for every version in the chain until the desired version is restored. This type of restoring operation can incur a substantial amount of processing and disk read/write activity while also delaying the time it takes for the requestor of a file to receive a restored full version of his/her file.

In some implementations, the current subject matter system can be configured to efficiently process a restore request by examining the delta file of the version to be restored and recreating that version based on the delta files themselves, without having to uncompress each version that is more recent than itself. Within the delta file of the version to be restored, there can exist one or more INSERT and/or COPY commands and/or various combination sequences of these commands. The INSERT commands, which also include the range of one or more bytes that were found to be different, can be used directly to create the file to be restored. The COPY command(s) of that same delta file can be used to identify the range of bytes in the more recent adjacent version(s) that is used to create the other byte ranges of the file. This operation can continue forward through the version chain until all COPY commands are replaced by the original byte ranges of the file. Once all deltas have been combined up to the beginning or "head" of the version chain, a single combined patch file can be applied to the head to restore the original version.

Another common and computationally costly operation in the management of version chains can include removal of one or more versions from somewhere in the middle of a version chain. This operation can involve serial uncompressing and deletion of all of the versions that are more recent than the file to be deleted. At that point, the file can be deleted and the two versions that were adjacent to the version that was deleted are delta compressed against each other. This consumes a tremendous amount of disk I/O and computing power.

In some implementations, in order to remove a version from a version chain, the current subject matter system can be configured to use information about the version to be removed and its two adjacent versions. By using COPY and INSERT commands within these three versions, the delta version of the least recent of the three versions can be recomputed to represent the difference between itself and the most recent of the three files.

The following discussion illustrates various implementations of the current subject matter for efficiently managing version chains.

FIG. 1 illustrates a conventional version chain that employs delta compression. In this example, the version chain includes an encapsulation of ten versions of a single file. It can also represent ten versions of segments of data that originated from one or more data streams that are similar to each other. The most recent version 101 (represented by a square) is stored in its whole form or may be data compressed using a common data compression algorithm such as gzip or Lempel-Ziv. All earlier versions 102 (represented by triangles) are stored as differences or delta compressed files that are created by storing different bytes between successive versions. The next most recent version 103 of the file is located next to the most recent version 103 in the version chain.

FIG. 2 illustrates a conventional method for restoring an earlier version of a file that is located within a delta version chain. The version chain illustrated in FIG. 2 includes a most recent version 201 (represented as a square with number 10 inside) and earlier versions 1-9 (represented by triangles with corresponding numbers). The numbers 1-9 correspond to a time sequence of creating versions of a file, i.e., the smaller the number, the earlier the version was created (i.e., corresponding to a least recent version). In the illustrated example, it is assumed that a user wishes to restore file version 207 that corresponds to a delta-compressed version 202 (i.e., version

5). In order to restore the complete earlier version 207, all files from the most recent version 201 (version #10) through the delta-compressed version to be restored 202 are serially un-delta-compressed. Initially, it is the version 209 (version #9) that is uncompressed into file 203 that is created from the file 201 and the differences stated in the delta version file 209. This process continues serially along the length of the version chain toward the version 202 by taking a delta decompressed version of a file and using a leftmost adjacent delta to recreate its original content (i.e., file 204 is created from uncompressed file 203 and delta-compressed version #8; file 205 is created from the uncompressed file 204 and delta-compressed version #7; file 206 is created from the uncompressed file 205 and delta-compressed version #6; file 207 is created from the uncompressed file 206 and delta-compressed version #5). Thus, in order to recreate the first version of the file 210, all delta versions #9-#1 of the file in the version chain are decompressed in a similar manner, i.e., nine different delta decompression operations are performed to recreate the original file. Hence, in version chains that contain thousands of delta versions, restoration of the first version can incur thousands of delta decompression operations. Such process is compute and disk I/O intensive and can take minutes to hours to complete. Restoration of an early version from a delta version chain of an accidentally deleted file is typically an urgent activity, so it is of great benefit to users of backup data deduplication appliances that employ delta compression techniques to process these requests in an expeditious manner.

FIG. 3a illustrates a process 300 for restoring an earlier version of a file using delta compressed versions, where the compressed versions can be created using a convention delta compression process. The process 300 also illustrates various changes to the file that can occur during a particular time period. As shown in FIG. 3a, instead of serially delta-decompressing every version from the most recent version backward in the version chain until the correct version is decompressed, the process 300 begins with the delta version of the file to be restored and then moves toward the head of the version chain to create a "super-delta" that can then be applied to the most recent version. The super-delta can be a predetermined sequence of COPY and/or INSERT commands that can be used to apply to a delta compressed version to recreate a full version of the file.

FIG. 3a shows a file 301 that includes three segments A, B, and C. As can be understood, a file can have any number of segments (tens, hundreds, thousands, millions, etc.). Three segments are shown to illustrate creation of delta version files.

A second version 302 of the file 301 can be created by appending a segment D. Thus, the first version of the file 301 can be replaced with a delta-compressed version of itself 303, where the delta-compressed version of the file includes a COPY (A, B, C) command. Thus, to recreate file 301 from the delta 303 and the most recent file 302, the file 301 is delta-decompressed using the COPY command of segments A, B and C from the most recent file (which does not include segment D).

A third version 304 of the file 301 can be created by deleting segment B from the version of the file 302. Thus, the second version of the file 302 can be replaced by a delta version 305 that contains an ordered sequence of the following commands COPY(A), INSERT(B), COPY (C, D). Since segment B does not exist in the latest version of the file 304, it can be encoded within the delta version file 305 using an INSERT(B) command, and all of the bytes associated with segment B can also be included within that delta version file 305. The INSERT(B) command for delta version 305 can be preceded by a COPY(A) command and followed by a COPY (C, D) command so that all of the segments required to recreate the original file 302 can be available.

A fourth version 306 of the file 301 can be created by inserting segment E into the third version 304, where version 304 can be replaced by a delta compressed version 307 that contains a COPY(A, C, D) command. The delta version file 307 that compactly represents the third file 304 can be computed as a delta of the fourth file version 306. In this case, all of the segments required to recreate the third version 304 can be contained within the most recent fourth version 306, so the delta version sequence for version 307 can be COPY(A, C, D) series of commands.

A fifth version 308 of the file 308 can be created and the fourth version of the file 306 can be replaced by a delta version 309. In this latest file version 308, segment E can be inserted at the beginning of the file, when compared with the fourth version 306. The delta version file 309 that compactly represents the fourth file 306 can be computed as a delta of the fifth file version 308. In this case, all of the segments except for segment C can be contained in the fifth file version (E, A, D), so the delta version file 309 can contain an INSERT(C) command for segment C, preceded by a COPY(E, A) command for segments E and then A, and followed by a COPY(D) command for segment D.

FIG. 3b illustrates an exemplary process 310 for recreating a version of a file, according to some implementations of the current subject matter. The version chain in FIG. 3b can include a most recent file 350 and four earlier versions 351, 352, 353, 354 of the file, each of which can be encoded as a delta-compressed version file. The delta version file 351 can represent the least recent or oldest version of the file in the version chain. The delta version file 352 can represent the next-to least recent version of the file in the version chain, the delta version file 353 is the next in line, where the version 354 is the next to the most recent version of the file. To recreate the least recent version 351 using conventional techniques can involve serially walking the version chain from the most recent version backward to the least recent version, which can be a time-, processing-, and I/O-consuming process.

Some embodiments of the current subject matter can provide for an efficient and expedient way to restore an earlier version of a file in the version chain by combining the delta version file recipes of all of the versions that contain the data required for that requested version. As illustrated in FIG. 3b, recreation of the whole version from the delta-compressed version file 351 can involve a recipe indicating aggregation of segments A, B and C. This is indicated by the COPY (A, B, C) instruction. Since this represents three consecutive COPY instructions, processing of the request can continue by looking into the more recent delta version files, i.e., delta-compressed version 352. Delta compressed version 352 includes a recipe containing three instructions 1. COPY(A), 2. INSERT(B), and 3. COPY(C, D). As stated above, the INSERT B instruction contains all of the bytes that are required to restore segment B in the original delta version file 351. The process can continue by looking for the source of data for segment A and segment C, i.e., by looking at the recipe contained with the delta-compressed version 353, that includes COPY(A, C, D) instruction. Within delta compressed version 353, no INSERT instructions can be found, thus, the process proceeds to evaluate recipe contained in the delta-compressed version 354, which includes instructions: 1. COPY(E, A), 2. INSERT(C), 3. COPY(D). The INSERT C instruction contains all of the bytes necessary to restore segment C of the delta version file 351. Next, the most recent file 350 is reached, and segment A can be found which allows restoration of the original file content of that segment. This means that contents of a restored filed 355 are obtained using the INSERT(B) instruction from delta-compressed version 352, INSERT(C) instruction from the delta-compressed version 354, and the most recent version 350 that includes segment A. Thus, the restored file 355 represents the original least recent version of a file from the version chain shown in FIG. 3*b*.

Some embodiments of the current subject matter can involve intelligent processing of the recipes for each delta file until all segments can be collected in order to restore the original file. In the example shown in FIG. 3*b*, all of the versions except version 353 were used in the reconstruction of the least recent version. File restoration can be considered complete when all of the necessary segments of data have been recovered from the version chain, regardless of whether it is the most recent file 350 or any other delta-compressed version file were used.

Referring to the example of version chain A→B→C, the following process can be used to generate a new patch file A' which can have a dependency on version C, according to some implementations of the current subject matter. The resulting version chain can have two disjoint delta dependencies A'→C and B→C instead of the original linear dependency A→B→C. The A' patch file can be uncompressed to generate the original version A data without requiring any data from version B, thus, the process can eliminate version A delta-dependency on version B.

In some implementations, an input to this process can include two delta compressed versions (i.e., patch files), where one patch file (A) can have a delta dependency on the other patch file (B). Both patch files A and B can be read into system memory. This process can implement the following operations: A-INSERT-OP, A-COPY-OP, B-INSERT-OP, B-COPY-OP, which can describe actions to be taken by a processor when encountering an INSERT and/or COPY instructions. These operations can be different from executing the original INSERT and/or COPY instructions to uncompress a patch file.

The process can begin with reading the patch instructions from version B and building a hashmap (e.g., "BInstrMap"), which can contain one element for every instruction in patch file B's instruction set. This hashmap can be a (key, value) pair combination. The key can be a virtual offset that can describe the offset of where data can be located in the uncompressed version B if this instruction were executed to uncompress version B. The value can be the instruction itself, e.g., INSERT(length) and/or COPY(offset, length). In this case, the INSERT instructions can refer to data in patch file B and the COPY instructions can refer to data in version B's dependency, i.e., version C in this example.

The process can then proceed to reading all patch file instructions from version A and executing A-INSERT-OP or A-COPY-OP operations depending on whether the original instruction is an INSERT or COPY, respectively. The operation A-INSERT-OP can be used for INSERT(length) instructions and can include the following:

Read <length> bytes from patch A data, write <length> bytes to output patch A' Write new INSERT(length) instruction to output patch A' which references this data The A-COPY-OP operation can be used for COPY(offset, length) instructions and can include the following:

a) Search through the BInstrMap for a key that describes an uncompressed offset that starts less than or equal to the needed data referenced by the version A COPY instruction and length extends into the range referenced by the version A COPY instruction. For example, this instruction can be called "BStartInstruction" and its starting offset can be called "BStartOffset."

b) Beginning at the BStartInstruction, read forward through the BInstrMap evaluating each of B's instructions, and execute the B-INSERT-OP or B-COPY-OP respectively, and stop when an instruction is reached that has a uncompressed offset greater than BStartOffset+length needed by A's COPY instruction.

The B-INSERT-OP can be used for INSERT(length) instructions and can include the following:

Read <length> bytes from patch B data, write to output patch A' Write new INSERT(length) instruction to output patch A' which references this data The B-COPY-OP can be used for COPY(offset, length) instructions and can include the following:

Write COPY instruction to patch A, such that it would copy <length> bytes from patch C The above process can be reproduced in pseudo-code as follows:

```
Iterate patch file B's instructions and build a map from instruction -> uncompressed
offset, call it BInstrMap
Open new patch file A', which will become A' -> C
For each instruction in A:
{
    If INSERT instruction
        Read A patch data, write A patch data verbatim to patch A'
        Write INSERT instruction to patch A' which references this data
    If COPY instruction
        Do divide and conquer search through the BInstrMap searching for the
instruction having an uncompressed offset that covers the start of needed data referenced
by the A instruction, call it the BStart instruction
        BCurrent instruction = BStart instruction
        remainingNeededLength = (A instruction).length
        While BCurrent.uncompressedOffset < (BStart.uncompressedOffset + (A
instruction).length)
        {
        newInstructionLength =
            (remainingNeededLength > BCurrent.length ? BCurrent.length:
remainingNeededLength)
            If (BCurrent == INSERT instruction)
            {
                Read newInstructionLength bytes from B patch data, write to A'
patch
```

-continued

```
        Write INSERT instruction to patch A' with newInstructionLength
bytes
        }
        else
        {
        Write COPY instruction to patch A' // copies newInstructionLength bytes
from patch C
        }
        remainingNeededLength -= newInstructionLength
        BCurrent++ // advance to next instruction in patch B
     }
} // for each instruction in patch A instruction list
Write patch trailer for A'
Close patch A'
```

FIG. 4 illustrates deletion of a version from a version chain. FIG. 4 shows a version chain 401 containing ten versions of a file over time. To delete a version of a file, as an example, assume that an application has determined that the sixth version 402 will be deleted (e.g., to conserve storage capacity and effectively reduce the length of the version chain). The state of the version chain 403 indicates that in order to eliminate the sixth version, all versions from version ten to version five may need to be serially delta-decompressed working from version ten back to version five. Once these have all been decompressed, version six can be deleted and delta-compression can be applied to all of the remaining versions to create a new shorter version chain 404. An example shown in FIG. 4 illustrates that longer version chains with thousands of versions can consume an amount of time to process a delete operation on an earlier version that is proportional to the position of version to be deleted within the version chain. Shorter version chains can make for more efficient version deletion operations.

FIG. 5 illustrates an exemplary process 500 for purging one or more versions from a version chain, according to some implementations of the current subject matter. FIG. 5 illustrates a historical creation of four file versions 501, then 502, then 503, and finally 504. A backup application can inform the backup deduplication processor where these version chains are stored and that the second version 502 is not necessary to retain and can be deleted. A delta compressed version file 505 contains a recipe of instructions that corresponds to the second version 502. The recipe includes: 1, COPY(A), 2. INSERT(B), 3. COPY(C, D). Instead of delta decompressing all of the versions up to 505 as well as the leftmost adjacent file to the delta version file to be deleted, as in the conventional methodology, the method 500 can be configured to leverage delta-compressed version file recipes of the delta file to be deleted 505 as well as the adjacent preceding 506 and proceeding 507 delta version files.

From the recipe of the delta-compressed version file to be deleted, a list of COPY and INSERT instructions can be created along with their respective offsets within the uncompressed file. As shown in FIG. 5, each version of the file 501-504 corresponds to its delta-compressed files containing respective recipes of COPY/INSERT instructions. The version chain 508 indicates a state of the version chain after the delta-compressed version 505 has been purged from the version chain. Since delta-compressed version 505 and its corresponding recipe of instructions has been removed from the chain, a new delta version file 509 can be created to incorporate all of the elements necessary to allow its original version to be recreated from delta-compressed version 507 (containing COPY (A, C, D) instructions) and other more recent dependent files. As shown in FIG. 5, delta-compressed version file 506 can depend on the INSERT B content of delta-compressed version file 505. With that version being deleted, the delta-compressed version file 506 can be replaced with a new recipe shown as delta-compressed version 509.

FIG. 6a illustrates another exemplary process 600 for deletion of a single version from a version chain, according to some embodiments of the current subject matter. Within each delta version file, there can exist zero or more INSERT and/or COPY instructions 605 (shown, for example, as "CA1" for COPY instruction and "IA1" for INSERT instruction). FIG. 6a illustrates three adjacent delta version files of a file, where version A 602 depends on version B 601 (i.e., version B is more recent than version A) and where version B is dependent on version C 603 (i.e., version C is more recent than version B). Version B can be the delta-compressed version that will be purged from the version chain. Instead of delta-compressed version A maintaining the recipe for how to recreate version A from version B, a new version A 604 can be created to maintain the recipe for how to create version A from version C directly, since version B will be purged.

Figure 6B:
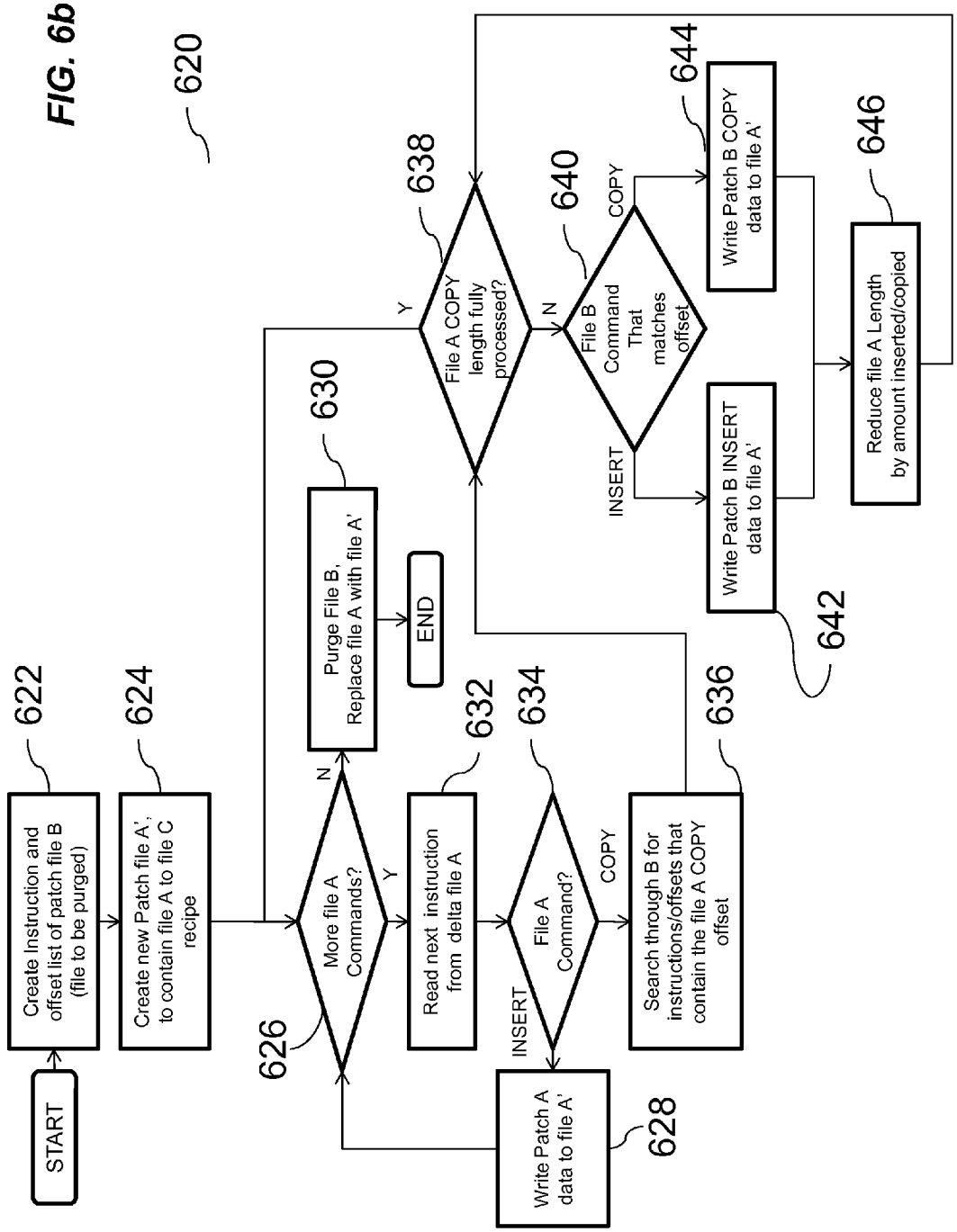

FIG. 6b illustrates an exemplary process 620 for replacing delta version A with a new delta-compressed version A' in order to allow delta-compressed version B shown in FIG. 6a to be purged. At 622, the process 620 can begin by creating an instruction and an offset list of patch file B (i.e., file to be purged). At 624, a new patch file A' can be created that contains instructions on how to recreate file A from file C. At 626, the process 620 can check whether there are more instructions/commands in the file A that need to be accounted for the purposes of recreating file A from file C once file B is purged. If not, then, at 630, file B can be purged and patch file A is replaced with patch file A', at which point the process 620 can terminate.

If there are additional instructions/commands, then, at 632, next instruction(s) in the patch file A are read. At 634, the process 620 can determine whether or not the instruction that was read at 632 is a COPY instruction or an INSERT instruction. If it is an INSERT instruction, then the data associated with that instruction in patch file A can be written into the patch file A' and the processing can return to 626 to determine whether there are any additional instructions that need to be read/written. If it is a COPY instruction, then the patch file B can be searched to determine whether there are any instructions/offsets that contain the file A COPY offset.

At 638, the process 620 can determine whether patch file A's COPY length has been fully processed, if so, then the processing returns to 626 to determine whether there are any additional instructions. Otherwise, at 640, the process 620 can determine what can be the patch file B instruction/command that matches the offset searched for at 636. If the instruction/command is a COPY instruction, then the patch file B COPY data can be written to the new patch file A', at 644. If it is an INSERT instruction, then the patch file B INSERT data can be written to the new patch file A', at 642. Then, at 646, the patch file A length can be reduced by the amount of data that is inserted/copied as a result of the COPY/INSERT instructions. A pseudo-code corresponding to the process 620 is illustrated above.

Figure 7A:
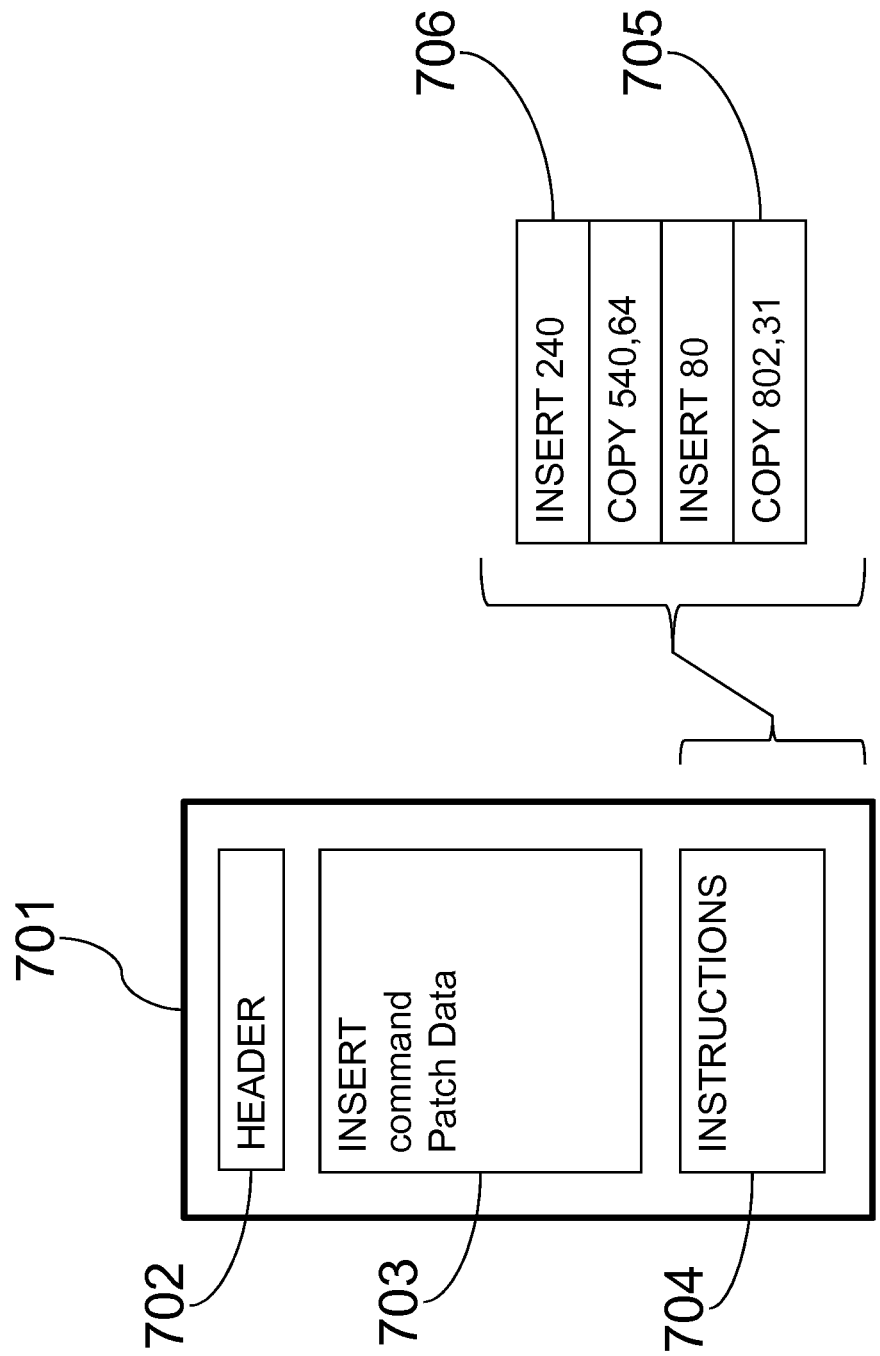
FIG. 7a illustrates a delta compressed patch file structure.

FIG. 7a illustrates an exemplary delta-compressed patch file 701 structure, according to some implementations of the current subject matter. The patch file 701 can include a header 702 area where information such as the original file name and the relative filename that the original file was delta compressed against are contained. The instructions section 704 of the delta compressed patch file of the file can contain a series of INSERT and COPY commands. These can contain any number of instructions (e.g., thousands of instructions) for a delta compressed file. The COPY command 705 format can contain a byte offset followed by the number of bytes to copy from the relative filename. The INSERT command 706 format can contain the number of bytes to insert at that point in the structure of the file. The actual bytes to be inserted are held in the INSERT command Patch Data area 703 of the delta compressed patch file.

FIG. 7b illustrates an exemplary delta-decompression operation, according to some implementations of the current subject matter. The delta version chain can made up of a reference file 711, called B, and a delta-compressed version file 710, called A. In some implementations, delta decompression can produce the original uncompressed version of file A 712. The details of the delta patch file A are shown in the box bearing reference numeral 713. As shown in FIG. 7b, there are three instructions 714 in the patch file that can contain a recipe for creating the uncompressed version of A 712. The first instruction can be an INSERT instruction. It can contain information that can indicate that the first 65 bytes of the uncompressed A file will come from the INSERT command Patch Data area 715 of the delta compressed patch file A 710. The second instruction can be a COPY instruction. It can indicate that starting at offset 240 in the adjacent B file 711, 90 bytes from that file can be appended to the 65 bytes that were already INSERTED into the uncompressed A file. The third instruction can be another INSERT instruction which can indicate to append the next 100 bytes from the INSERT command Patch Data area 715 (the 100 bytes following the first 65 bytes) to the end of the uncompressed A file 712.

FIG. 7c illustrates an exemplary process for managing byte offsets 730 when it is determined that a file needs to be deleted/purged, according to some implementations of the current subject matter. For example, FIG. 7c shows that a delta-compressed version file B 721 may need to be purged. Delta file A 720 can be modified to contain a recipe of instructions that can allow it to be recreated in the absence of delta file B 721. FIG. 7c illustrates delta file C 722 as a reference to a longer version chain and it is not modified in this process. Delta file A 720 can include a single COPY instruction, which can start at byte 2 of the uncompressed version of the delta file B 721 and can be 450 bytes long. In examining the delta file B 721 instructions, the first instruction can be an INSERT operation of 30 bytes and the 30 bytes can be contained within the INSERT command Patch Data Area 727. Of those 30 bytes, the first two bytes can be ignored since the COPY instruction in 720 starts at byte 2. Thus, the resulting patch file A' 726 can include an INSERT instruction with only the last 28 of 30 bytes contained in the patch file B 721 INSERT command Patch Data area. At this point, only 28 bytes of the 450 bytes specified in the COPY command within delta file A 720 can be combined.

Proceeding with the content of 721, the COPY 328, 5 command can be added from delta file B 721 directly to A' 726 since all 5 bytes can be contained within the 450 bytes that need to be included in the final A' delta file. At this point, 33 bytes (INSERT 28, COPY 5) of 450 bytes have been added to A' 726.

The next instruction can be an INSERT of 400 bytes. Since there are 417 bytes remaining to be added in the A' 726 delta file, the INSERT of all 400 bytes can be added to the A' 726 delta file. At this point, 433 bytes (INSERT 28, COPY 5, INSERT 400) of 450 bytes have been added to A' 726.

The next instruction can be a COPY of 600 bytes. Since 17 more bytes may be needed to fulfill the requirement of 450 bytes from the original copy instruction in delta file 720, a COPY command can be included in the delta file A' 726 that starts at the same offset as the COPY command in delta file B 721, but only the first 17 bytes are required to fulfill the requirement for 450 total bytes. With delta file A' 726 constructed, delta file B 721 can be deleted, and delta file A 720 can be replaced by delta file A' 726. If original file A needs to be recreated, it can be created from delta file C 722 and delta file A' 726.

PERFORMANCE EXAMPLE

The following illustrates an example of the performance improvement provided by some implementations of the current subject matter. In this example, a version chain with 250 delta versions was created, and a restore of the earliest version was requested. Using the conventional algorithm, it took approximately 7 minutes of wall-clock time to recreate that version of the file. Using the methods discussed herein, the time was reduced to only 7 seconds, a 60× improvement in performance. The test was executed on a server with conventional hardware (Intel Quad core CPUs, 12 MB of memory and a large 24 drive RAID6 local disk subsystem).

Figure 8:
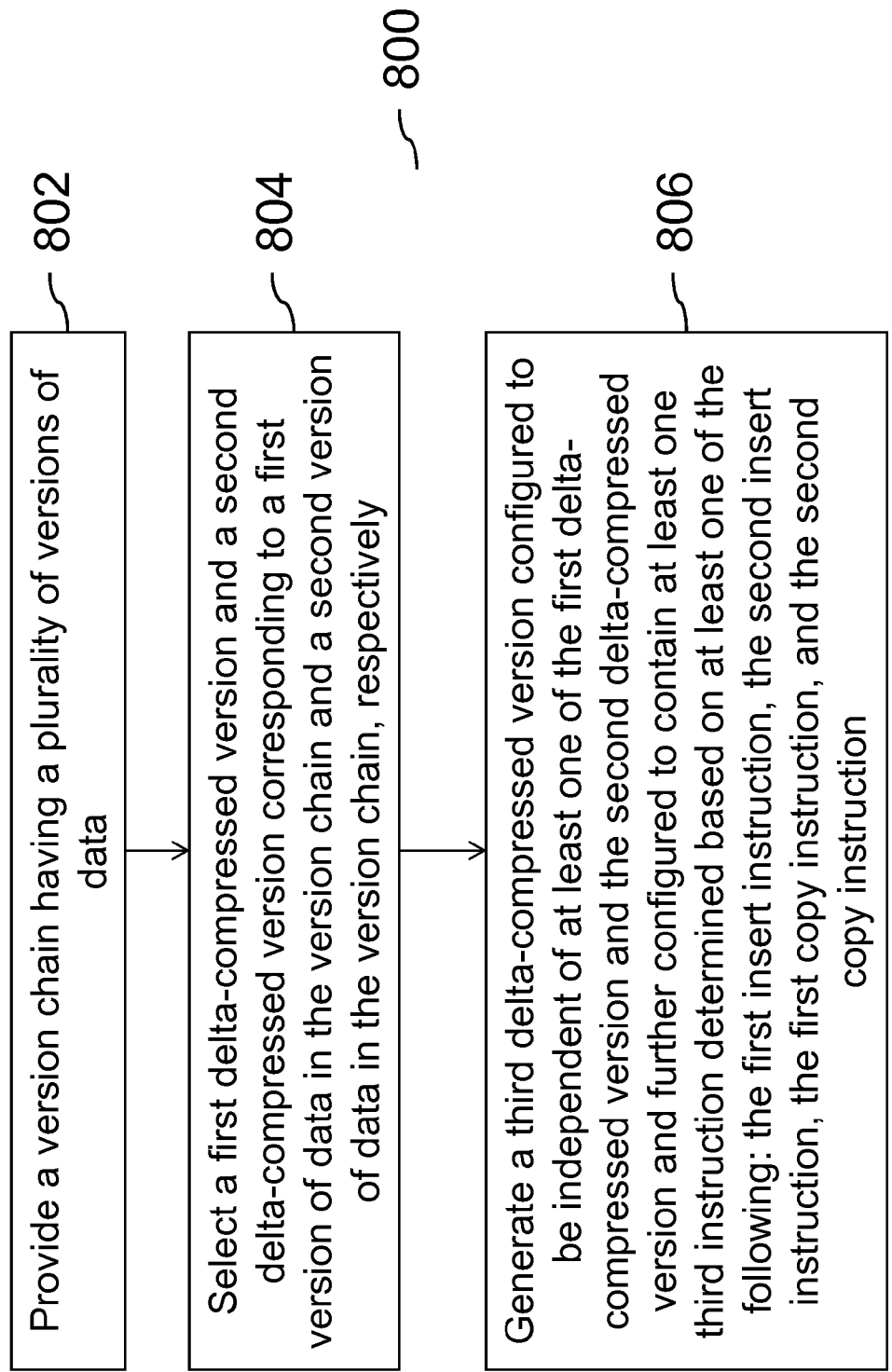
FIG. 8 illustrates an exemplary method, according to some implementations of the current subject matter.

FIG. 8 illustrates an exemplary method 800, according to some implementations of the current subject matter. At 802, a version chain having a plurality of versions of data can be provided. At 804, a first delta-compressed version and a second delta-compressed version corresponding to a first version of data in the version chain and a second version of data in the version chain, respectively, can be selected. The second delta-compressed version can be configured to depend on the first delta compressed version. The first delta-compressed version can be configured to include at least one of a first copy instruction and a first insert instruction. The second delta-compressed version can be configured to include at least one of a second copy instruction and a second insert instruction. At 806, a third delta-compressed version configured to be independent of at least one of the first delta-compressed version and the second delta-compressed version and further configured to contain at least one third instruction determined based on at least one of the following: the first insert instruction, the second insert instruction, the first copy instruction, and the second copy instruction can be generated. At least one of the providing, the selecting, and the generating can be performed on at least one processor.

In some implementations, the current subject matter can be configured to include at least one of the following optional features. The third delta-compressed version can contain at least one of the first insert instruction and the second insert instruction. The third delta-compressed version can contain an instruction that is modified from at least one of the first insert instruction and the second insert instruction. The third delta-compressed version can contain at least one of the first and second copy instructions depending on whether the first and second instructions are different from one another. The third delta-compressed version can contain an instruction that is modified from at least one of the first copy instruction and the second copy instruction.

The method can also include executing at least one third instruction contained in the generated third delta-compressed version to generate an uncompressed version of data in the version chain.

At least one third instruction can include at least one parameter, wherein the at least one parameter includes at least one of the following a length parameter defining a length of data to be copied in the uncompressed version of data and an offset parameter defining a location of data to be copied in the uncompressed version of data.

The executing can include executing the at least one third instruction contained in the generated third delta-compressed version in a predetermined order.

At least one of the first and second copy instructions can cause a copy of a data segment into an uncompressed version of data in the version chain, wherein the data segment is present in both a first uncompressed version of data configured to be generated based on the first delta-compressed version and in a second uncompressed version of data configured to be generated based on the second delta-compressed version. The first insert operation can cause insertion of a first data segment into the uncompressed version of data in the version chain, wherein the first data segment is present in a first uncompressed version of data configured to be generated based on the first delta-compressed version. The second insert instruction can cause insertion of a second data segment into the uncompressed version of data in the version chain, wherein the second data segment is present in a second uncompressed version of data configured to be generated based on the second delta-compressed version.

The method can also include deleting at least one of the first delta-compressed version and the second delta-compressed version without uncompressing the first delta-compressed version and the second delta-compressed version. Further, the method can include repeating the providing, the selecting, and the generating operations to enable faster restore of a version in the version chain.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a connection 950. The processor 910 can be configured to process instructions for execution within the system 900. The processor 910 can be further configured to process various instructions and perform operations, including those shown in FIG. 5, as well as those that are stored in the memory 920 or on the storage device 930, including receiving or sending information through the input/output device 940. The memory 920 can store information within the system 900. In some implementations, the memory 920 can be a computer-readable medium, a volatile memory unit, a non-volatile memory unit, or any other suitable medium/unit. The storage device 930 can be capable of providing mass storage for the system 900 and can be a computer-readable medium, a floppy disk device, a hard disk device, an optical disk device, a tape device, non-volatile solid state memory, or any other suitable storage device. The input/output device 940 can be a network interface and/or any other system, device, and/or any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
providing a version chain having a plurality of versions of data; selecting a first delta-compressed version and a second delta-compressed version corresponding to a first version of data in the version chain and a second version of data in the version chain, respectively, wherein
the second delta-compressed version is configured to depend on the first delta compressed version;
the first delta-compressed version is configured to include at least one of a first copy instruction and a first insert instruction; and
the second delta-compressed version is configured to include at least one of a second copy instruction and a second insert instruction;
generating a third delta-compressed version configured to be independent of at least one of the first delta-compressed version and the second delta-compressed version and further configured to contain at least one third instruction determined based on a predetermined combination of at least one of the following: the first insert instruction, the second insert instruction, the first copy instruction, and the second copy instruction, whereby the third delta-compressed version is configured to be used to retrieve any version in the version chain;
wherein the at least one of the providing, the selecting, and the generating is performed on at least one processor; and
wherein the at least one third instruction is configured to include at least one parameter, wherein the at least one parameter includes at least one of the following a length parameter defining a length of data to be copied in the uncompressed version of data and an offset parameter defining a location of data to be copied in the uncompressed version of data; and
wherein at least one the first and second copy instructions is configured to cause a copy of a data segment into an uncompressed version of data in the version chain, wherein the data segment is present in both a first uncompressed version of data configured to be generated based on the first delta-compressed version and in a second uncompressed version of data configured to be generated based on the second delta-compressed version.

2. The method according to claim 1, wherein the third delta-compressed version is configured to contain at least one of the first insert instruction and the second insert instruction.

3. The method according to claim 2, wherein the third delta-compressed version is configured to contain an instruction that is modified from at least one of the first insert instruction and the second insert instruction.

4. The method according to claim 1, wherein the third delta-compressed version is configured to contain at least one of the first and second copy instructions depending on whether the first and second instructions are different from one another.

5. The method according to claim 4, wherein the third delta-compressed version is configured to contain an instruction that is modified from at least one of the first copy instruction and the second copy instruction.

6. The method according to claim 1, further comprising executing the at least one third instruction contained in the generated third delta-compressed version to generate an uncompressed version of data in the version chain.

7. The method according to claim 1, wherein the executing further comprises executing the at least one third instruction contained in the generated third delta-compressed version in a predetermined order.

8. The method according to claim 1, wherein
the first insert operation is configured to cause insertion of a first data segment into the uncompressed version of data in the version chain, wherein the first data segment is present in a first uncompressed version of data configured to be generated based on the first delta-compressed version;

the second insert instruction is configured to cause insertion of a second data segment into the uncompressed version of data in the version chain, wherein the second data segment is present in a second uncompressed version of data configured to be generated based on the second delta-compressed version.

9. The method according to claim 1, further comprising deleting at least one of the first delta-compressed version and the second delta-compressed version without uncompressing the first delta-compressed version and the second delta-compressed version.

10. The method according to claim 1, further comprising repeating the providing, the selecting, and the generating to enable faster restore of a version in the version chain.

11. A system for storing data, comprising:
at least one processor; and
at least one machine-readable medium storing instructions that, when executed by the at least one processor, cause the at least one processor to perform operations comprising:
providing a version chain having a plurality of versions of data;
selecting a first delta-compressed version and a second delta-compressed version corresponding to a first version of data in the version chain and a second version of data in the version chain, respectively, wherein
the second delta-compressed version is configured to depend on the first delta compressed version;
the first delta-compressed version is configured to include at least one of a first copy instruction and a first insert instruction; and the second delta-compressed version is configured to include at least one of a second copy instruction and a second insert instruction;
generating a third delta-compressed version configured to be independent of at least one of the first delta-compressed version and the second delta-compressed version and further configured to contain at least one third instruction determined based on a predetermined combination of at least one of the following: the first insert instruction, the second insert instruction, the first copy instruction, and the second copy instruction, whereby the third delta-compressed version is configured to be used to retrieve any version in the version chain; and
wherein the at least one third instruction is configured to include at least one parameter, wherein the at least one parameter includes at least one of the following a length parameter defining a length of data to be copied in the uncompressed version of data and an offset parameter defining a location of data to be copied in the uncompressed version of data; and
wherein at least one the first and second copy instructions is configured to cause a copy of a data segment into an uncompressed version of data in the version chain, wherein the data segment is present in both a first uncompressed version of data configured to be generated based on the first delta-compressed version and in a second uncompressed version of data configured to be generated based on the second delta-compressed version.

12. The system according to claim 11, wherein the third delta-compressed version is configured to contain at least one of the first insert instruction and the second insert instruction.

13. The system according to claim 12, wherein the third delta-compressed version is configured to contain an instruction that is modified from at least one of the first insert instruction and the second insert instruction.

14. The system according to claim 11, wherein the third delta-compressed version is configured to contain at least one of the first and second copy instructions depending on whether the first and second instructions are different from one another.

15. The system according to claim 14, wherein the third delta-compressed version is configured to contain an instruction that is modified from at least one of the first copy instruction and the second copy instruction.

16. The system according to claim 11, wherein the operations further comprise
executing the at least one third instruction contained in the generated third delta-compressed version to generate an uncompressed version of data in the version chain.

17. The system according to claim 11, wherein the executing further comprises executing the at least one third instruction contained in the generated third delta-compressed version in a predetermined order.

18. The system according to claim 11, wherein
the first insert operation is configured to cause insertion of a first data segment into the uncompressed version of data in the version chain, wherein the first data segment is present in a first uncompressed version of data configured to be generated based on the first delta-compressed version;
the second insert instruction is configured to cause insertion of a second data segment into the uncompressed version of data in the version chain, wherein the second data segment is present in a second uncompressed version of data configured to be generated based on the second delta-compressed version.

19. The system according to claim 11, further comprising deleting at least one of the first delta-compressed version and the second delta-compressed version without uncompressing the first delta-compressed version and the second delta-compressed version.

20. The system according to claim 11, further comprising repeating the providing, the selecting, and the generating to enable faster restore of a version in the version chain.

21. A non-transitory computer program product comprising machine-readable medium storing instructions that, when executed by the at least one processor, cause the at least one processor to perform operations comprising:
providing a version chain having a plurality of versions of data;
selecting a first delta-compressed version and a second delta-compressed version corresponding to a first version of data in the version chain and a second version of data in the version chain, respectively, wherein
the second delta-compressed version is configured to depend on the first delta compressed version;
the first delta-compressed version is configured to include at least one of a first copy instruction and a first insert instruction; and
the second delta-compressed version is configured to include at least one of a second copy instruction and a second insert instruction;
generating a third delta-compressed version configured to be independent of at least one of the first delta-compressed version and the second delta-compressed version and further configured to contain at least one third instruction determined based on a predetermined combination of at least one of the following: the first insert instruction, the second insert instruction, the first copy instruction, and the second copy instruction, whereby the third delta-compressed version is configured to be used to retrieve any version in the version chain; and wherein the at least one third instruction is configured to include at least one parameter, wherein the at least one parameter includes at least one of the following a length parameter defining a length of data to be copied in the uncompressed version of data and an offset parameter defining a location of data to be copied in the uncompressed version of data; and wherein at least one the first and second copy instructions is configured to cause a copy of a data segment into an uncompressed version of data in the version chain, wherein the data segment is present in both a first uncompressed version of data configured to be generated based on the first delta-compressed version and in a second uncompressed version of data configured to be generated based on the second delta-compressed version.

22. The computer program product according to claim 21, wherein the third delta-compressed version is configured to contain at least one of the first insert instruction and the second insert instruction.

23. The computer program product according to claim 22, wherein the third delta-compressed version is configured to contain an instruction that is modified from at least one of the first insert instruction and the second insert instruction.

24. The computer program product according to claim 21, wherein the third delta-compressed version is configured to contain at least one of the first and second copy instructions depending on whether the first and second instructions are different from one another.

25. The computer program product according to claim 24, wherein the third delta-compressed version is configured to contain an instruction that is modified from at least one of the first copy instruction and the second copy instruction.

26. The computer program product according to claim 21, wherein the operations further comprise
executing the at least one third instruction contained in the generated third delta-compressed version to generate an uncompressed version of data in the version chain.

27. The computer program product according to claim 21, wherein the executing further comprises executing the at least one third instruction contained in the generated third delta-compressed version in a predetermined order.

28. The computer program product according to claim 21, wherein
the first insert operation is configured to cause insertion of a first data segment into the uncompressed version of data in the version chain, wherein the first data segment is present in a first uncompressed version of data configured to be generated based on the first delta-compressed version;
the second insert instruction is configured to cause insertion of a second data segment into the uncompressed version of data in the version chain, wherein the second data segment is present in a second uncompressed version of data configured to be generated based on the second delta-compressed version.

29. The computer program product according to claim 21, further comprising
deleting at least one of the first delta-compressed version and the second delta-compressed version without uncompressing the first delta-compressed version and the second delta-compressed version.

30. The computer program product according to claim 21, further comprising repeating the providing, the selecting, and the generating to enable faster restore of a version in the version chain.

* * * * *